United States Patent
Vernacchia et al.

(10) Patent No.: US 9,547,314 B2
(45) Date of Patent: Jan. 17, 2017

(54) SYSTEM AND METHOD FOR CONTROLLING VEHICLE ACCELERATION

(71) Applicant: GM Global Technology Operations LLC, Detroit, MI (US)

(72) Inventors: Mark A. Vernacchia, Northville, MI (US); Jeong J. Park, Ann Arbor, MI (US); Pierre U. Mokwe, West Bloomfield, MI (US); James Mason Faucett, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 28 days.

(21) Appl. No.: 14/282,440

(22) Filed: May 20, 2014

(65) Prior Publication Data

US 2015/0338856 A1  Nov. 26, 2015

(51) Int. Cl.

| | |
|---|---|
| *G05D 13/62* | (2006.01) |
| *B60W 20/10* | (2016.01) |
| *F02D 28/00* | (2006.01) |
| *F02D 29/02* | (2006.01) |
| *B60W 10/06* | (2006.01) |
| *B60L 15/20* | (2006.01) |
| *B60W 10/08* | (2006.01) |
| *B60W 20/00* | (2016.01) |
| *B60W 30/18* | (2012.01) |

(52) U.S. Cl.
CPC .............. *G05D 13/62* (2013.01); *B60L 15/20* (2013.01); *B60W 10/06* (2013.01); *B60W 10/08* (2013.01); *B60W 20/10* (2013.01); *B60W 30/18* (2013.01); *B60W 30/18009* (2013.01); *F02D 28/00* (2013.01); *F02D 29/02* (2013.01); *B60W 2520/105* (2013.01); *B60W 2540/10* (2013.01); *B60W 2710/0666* (2013.01); *B60W 2710/083* (2013.01); *B60W 2720/106* (2013.01); *Y02T 10/7258* (2013.01); *Y10S 903/93* (2013.01)

(58) Field of Classification Search
CPC ........ B60L 15/20; B60W 10/06; B60W 10/08; B60W 20/10; G05D 13/62; F02D 28/00
See application file for complete search history.

(56) References Cited

U.S. PATENT DOCUMENTS

| | | |
|---|---|---|
| 3,911,343 A | 10/1975 | Oster |
| 5,184,527 A | 2/1993 | Nakamura |
| 5,496,227 A | 3/1996 | Minowa et al. |

(Continued)

OTHER PUBLICATIONS

U.S. Appl. No. 14/093,803, filed Dec. 2, 2013, Park et al.

*Primary Examiner* — Basil T Jos

(57) ABSTRACT

A system according to the principles of the present disclosure includes an acceleration delta module and a remedial action module. The acceleration delta module determines an acceleration delta of a vehicle based on a difference between an actual acceleration of the vehicle and a desired acceleration of the vehicle. The acceleration delta module also determines an average value of the acceleration delta corresponding to at least one of a first predetermined period and a predetermined number of samples of the acceleration delta. The remedial action module, based on the average value of the acceleration delta and independent of a torque command generated to accelerate the vehicle, selectively takes a remedial action by adjusting operation of at least one of an engine and an electric motor.

20 Claims, 5 Drawing Sheets

(56) References Cited

U.S. PATENT DOCUMENTS

| | | | |
|---|---|---|---|
| 5,725,214 | A | 3/1998 | Adams |
| 8,195,370 | B2 | 6/2012 | Simon, Jr. et al. |
| 8,255,139 | B2 | 8/2012 | Whitney et al. |
| 8,635,004 | B2 | 1/2014 | Whitney et al. |
| 9,126,592 | B2 | 9/2015 | Park et al. |
| 2005/0148428 | A1 | 7/2005 | Cullen et al. |
| 2008/0220934 | A1 | 9/2008 | Babcock et al. |
| 2009/0043466 | A1 | 2/2009 | Nakai et al. |
| 2009/0063000 | A1 | 3/2009 | Kodama et al. |
| 2011/0022284 | A1* | 1/2011 | Umakoshi ............ B60W 30/16 701/70 |
| 2012/0059539 | A1 | 3/2012 | Arnett et al. |
| 2012/0290187 | A1 | 11/2012 | Oesterreicher et al. |
| 2013/0151074 | A1 | 6/2013 | Takeuchi et al. |
| 2013/0297111 | A1 | 11/2013 | Yamazaki et al. |
| 2014/0244084 | A1 | 8/2014 | Raftry |
| 2015/0127200 | A1* | 5/2015 | Takeuchi et al. ............... 701/22 |

\* cited by examiner

SYSTEM AND METHOD FOR CONTROLLING VEHICLE ACCELERATION

FIELD

The present disclosure relates to internal combustion engines, and more specifically, to systems and methods for controlling vehicle acceleration.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque and thereby accelerates a vehicle. Additionally or alternatively, an electric motor may be used to produce drive torque and thereby accelerate the vehicle. The amount of drive torque produced is based on a driver input such as the position of an accelerator pedal or a cruise control setting. An engine control system typically stores multiple mappings of the driver input to a desired torque and determines a driver torque request based on a selected one of the mappings. The engine control system may then generate a torque command based on the driver torque request and other torque requests, and use the torque command to control the amount of drive torque produced. The other torque requests may include torque requests generated to compensate for accessory loads, to facilitate a transmission shift, and/or to assist with traction control.

In some instances, the amount of drive torque produced may result in vehicle acceleration that is different than desired. The difference between the desired vehicle acceleration and the actual vehicle acceleration may be referred to as a vehicle acceleration delta. Some engine control systems may determine a desired torque based on the driver torque request and the other torque requests in parallel with generating the torque command. The engine control systems may then determine a difference between the desired torque and the torque command and compare the difference to a threshold torque, which may be predetermined through calibration. If the difference is greater than the threshold torque and the vehicle acceleration delta is greater than desired, the engine control systems may shut off an engine to decrease the vehicle acceleration delta. Evaluating the torque command using a threshold torque to decrease the vehicle acceleration delta adds cost and complexity. In addition, shutting off the engine may be undesired in certain situations and may result in undesired cost and inconvenience to the driver.

SUMMARY

A system according to the principles of the present disclosure includes an acceleration delta module and a remedial action module. The acceleration delta module determines an acceleration delta of a vehicle based on a difference between an actual acceleration of the vehicle and a desired acceleration of the vehicle. The acceleration delta module also determines an average value of the acceleration delta corresponding to at least one of a first predetermined period and a predetermined number of samples of the acceleration delta. The remedial action module, based on the average value of the acceleration delta and independent of a torque command generated to accelerate the vehicle, selectively takes a remedial action by adjusting operation of at least one of an engine and an electric motor.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A system and method according to the present disclosure determines an average value of an acceleration delta corresponding to a predetermined period and/or a predetermined number of acceleration delta data points. The system and method may take a remedial action when the average value of the acceleration delta is greater than a predetermined value. For example, the system and method may control the amount of torque produced by an engine and/or an electric motor based on a torque request, and may decrease the torque request when the average value is greater than the predetermined value.

After the remedial action is taken, the system and method determines whether the average value of the acceleration delta has decreased to a value that is less than the predetermined value. If the average value of the acceleration delta is less than the predetermined value, the system and method returns the engine and/or the electric motor to normal operation. In this manner, the system and method may prevent acceleration deltas greater than a certain magnitude without shutting off the engine and/or the electric motor. In addition, the system and method may take the remedial action independent of torque command(s) used to control the engine and/or the electric motor in order to avoid the cost and complexity of evaluating the torque command using a threshold torque.

Figure 1:
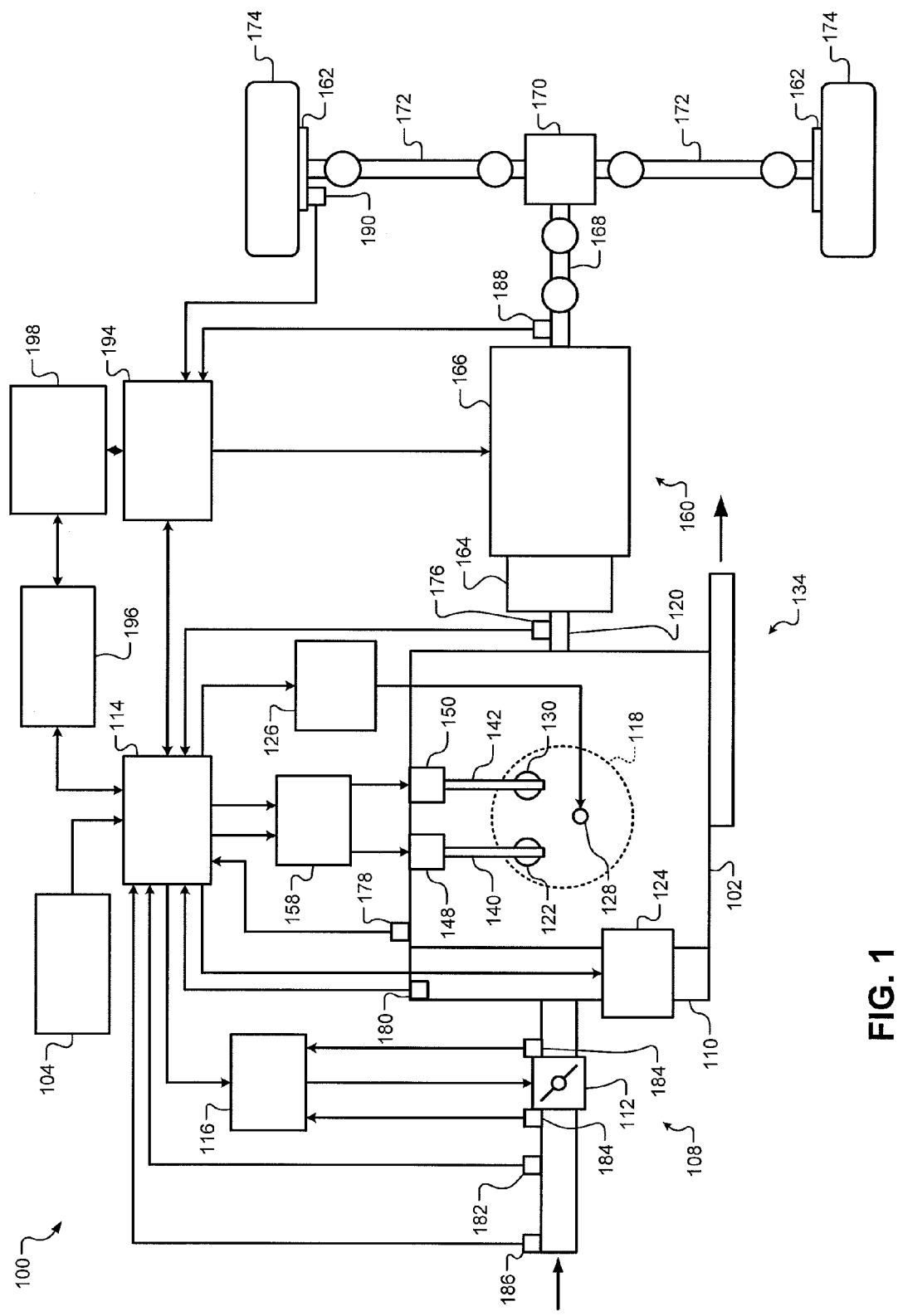
FIG. 1 is a functional block diagram of an example vehicle system according to the principles of the present disclosure.

Referring now to FIG. 1, an example implementation of a vehicle system 100 includes an engine 102 that combusts an air/fuel mixture to produce drive torque for a vehicle. The amount of drive torque produced by the engine 102 is based on a driver input from a driver input module 104. The driver input may be based on a position of an accelerator pedal. The driver input may also be based on a cruise control system, which may be an adaptive cruise control system that varies vehicle speed to maintain a predetermined following distance.

Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft 120, two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 to generate a spark in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a spark timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, combustion of the air/fuel mixture drives the piston down, thereby driving the crankshaft 120. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake and exhaust cam phasers 148, 150 based on signals from the ECM 114. When implemented, variable valve lift may also be controlled by the valve actuator module 158.

The valve actuator module 158 may deactivate the cylinder 118 by disabling opening of the intake valve 122 and/or the exhaust valve 130. The valve actuator module 158 may disable opening of the intake valve 122 by decoupling the intake valve 122 from the intake cam phaser 148. Similarly, the valve actuator module 158 may disable opening of the exhaust valve 130 by decoupling the exhaust valve 130 from the exhaust cam phaser 150. In various implementations, the valve actuator module 158 may control the intake valve 122 and/or the exhaust valve 130 using devices other than camshafts, such as electromagnetic or electrohydraulic actuators.

Torque output at the crankshaft 120 is transferred through a drivetrain system 160 to wheels 162. The drivetrain system 160 includes a torque converter 164, a transmission 166, a drive shaft 168, a differential 170, and axle shafts 172. The torque converter 164, the transmission 166, and the differential 170 amplify engine torque by several gear ratios to provide axle torque at the axle shafts 172. The axle torque rotates the wheels 162 and tires 174 mounted on the wheels 162, which causes the vehicle to accelerate in a forward or rearward direction.

The vehicle system 100 may measure the position of the crankshaft 120 using a crankshaft position (CKP) sensor 176. The temperature of the engine coolant may be measured using an engine coolant temperature (ECT) sensor 178. The ECT sensor 178 may be located within the engine 102 or at other locations where the coolant is circulated, such as a radiator (not shown).

The pressure within the intake manifold 110 may be measured using a manifold absolute pressure (MAP) sensor 180. In various implementations, engine vacuum, which is the difference between ambient air pressure and the pressure within the intake manifold 110, may be measured. The mass flow rate of air flowing into the intake manifold 110 may be measured using a mass air flow (MAF) sensor 182. In various implementations, the MAF sensor 182 may be located in a housing that also includes the throttle valve 112.

The throttle actuator module 116 may monitor the position of the throttle valve 112 using one or more throttle position sensors (TPS) 184. The ambient temperature of air being drawn into the engine 102 may be measured using an intake air temperature (IAT) sensor 186. The output speed of the transmission 166 may be measured using a transmission output speed (TOS) sensor 188. The speed of the wheels 162 may be measured using a wheel speed sensor (WSS) 190. The ECM 114 may use signals from the sensors to make control decisions for the vehicle system 100.

The ECM 114 may communicate with a transmission control module (TCM) 194 to coordinate shifting gears in the transmission 166. For example, the ECM 114 may reduce engine torque during a gear shift. Although some of the sensor signals are shown provided to the TCM 194, the TCM 194 may relay these sensor signals to the ECM 114. Alternatively, these sensor signals may be provided to the ECM 114 directly.

The ECM 114 may communicate with a hybrid control module (HCM) 196 to coordinate operation of the engine 102 and an electric motor 198. The electric motor 198 may also function as a generator, and may be used to produce electrical energy for use by vehicle electrical systems and/or for storage in a battery. Additionally or alternatively, the electric motor 198 may provide drive torque directly to the drivetrain system 160 independent of the engine 102. In addition, the engine 102 may be omitted, and drive torque may be provided by the electric motor 198 alone. In various implementations, various functions of the ECM 114, the TCM 194, and/or the HCM 196 may be integrated into one or more modules. The ECM 114, the TCM 194, and the HCM 196, individually or collectively, may be referred to as a powertrain control module.

Figure 2:
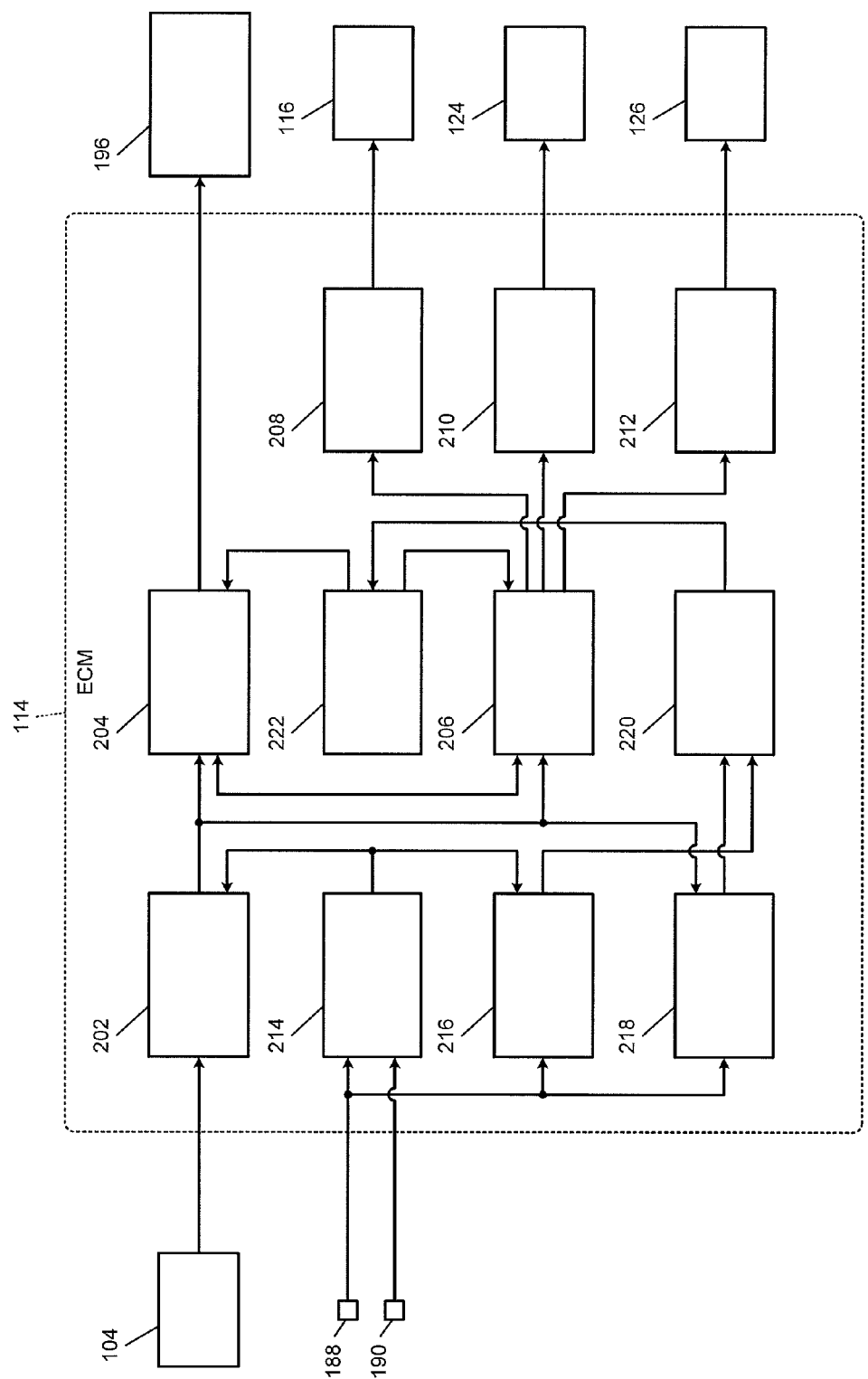
FIG. 2 is a functional block diagram of an example control system according to the principles of the present disclosure.

Referring now to FIG. 2, an example implementation of the ECM 114 includes a driver torque request module 202. The driver torque request module 202 determines a driver torque request based on the driver input from the driver input module 104. For example, the driver torque request module 202 may store one or more mappings of accelerator pedal position to desired torque and determine the driver torque request based on a selected one of the mappings. The driver torque request module 202 may select one of the mappings based on the speed of the vehicle and/or the grade of a road on which the vehicle is travelling. The driver torque request module 202 outputs the driver torque request.

A motor torque control module 204 and an engine torque control module 206 control the torque output of the electric motor 198 and the engine 102, respectively, based on the driver torque request. Although the motor torque control module 204 is shown in the ECM 114, the motor torque control module 204 may be included in the HCM 196. The motor torque control module 204 outputs a motor torque command to control the torque output of the electric motor 198. The engine torque control module 206 outputs an engine torque command to control the torque output of the engine.

The motor torque control module 204 may determine whether a storage level of a battery that supplied power to the electric motor 198 is greater than a predetermined level. If the battery storage level is greater than the predetermined level, the motor torque control module 204 may adjust the motor torque output to at least partially satisfy the driver torque request. Otherwise, the motor torque control module 204 may adjust the motor torque command to zero or to a negative value (to charge the battery), and the engine torque control module 206 may set the engine torque command equal to the driver torque request. In implementations where the engine 102 is omitted and drive torque is provided by the electric motor 198 alone, the motor torque control module 204 may adjust the motor torque output to completely satisfy the driver torque request.

If the battery storage level is greater than the predetermined level, the motor torque control module 204 may determine whether the driver torque request is greater than a torque capacity of the electric motor 198. If the driver torque request is greater than the torque capacity of the electric motor 198, the motor torque control module 204 may set the motor torque command equal to the motor torque capacity. In addition, the engine torque control module 206 may set the engine torque command equal to a difference between the driver torque request and the motor torque capacity.

A throttle control module 208 outputs a desired throttle position, and the throttle actuator module 116 adjusts the position of the throttle valve 112 to achieve the desired throttle position. A fuel control module 210 outputs a desired fueling rate, and the fuel actuator module 124 controls fuel injection in the engine 102 based on the desired fueling rate. A spark control module 212 outputs desired spark timing, and the spark actuator module 126 controls the spark plug 128 based on the desired spark timing.

The throttle control module 208, the fuel control module 210, and the spark control module 212 may adjust the throttle position, the fueling rate, and the spark timing, respectively, based on the engine torque command. If the engine 102 is a spark-ignition engine, the throttle control module 208 may adjust the throttle position based on the engine torque command, and the fuel control module 210 may adjust the fueling rate based on the desired air/fuel ratio. If the engine 102 is a compression-ignition engine, the fuel control module 210 may adjust the fueling rate based on the engine torque command. In either case, the spark control module 212 may adjust the spark timing based on the engine torque command.

A vehicle speed module 214 determines the speed of the vehicle. The vehicle speed module 214 may determine the vehicle speed based on the transmission output speed from the TOS sensor 188 and/or the wheel speed from the WSS 190. An actual acceleration module 216 determines the actual acceleration of the vehicle.

The actual acceleration module 216 may determine the actual acceleration based on the vehicle speed. For example, the actual acceleration module 216 may determine the derivative of the vehicle speed with respect to time to obtain the actual acceleration. Additionally or alternatively, the actual acceleration module 216 may determine the actual acceleration based on the transmission output speed. For example, the actual acceleration module 216 may determine the actual acceleration using a relationship such as $$a_{actual}(g) = \frac{2 * \pi * r(m)}{9.81 * 60 * FDR} * TOS(\text{rpm/s}) \qquad (1)$$

where $a_{actual}(g)$ is the actual acceleration in g's, $r(m)$ is the rolling radius of the tires 174 in meters, FDR is a final drive ratio from the output side the transmission 166 to the wheels 162, and TOS(rpm/s) is the transmission output speed in revolutions per minute per second. In the example implementation of the vehicle system 100 shown in FIG. 1, the final drive ratio is equal to the ratio of the differential 170.

A desired acceleration module 218 determines a desired acceleration of the vehicle. The desired acceleration module may determine the desired acceleration based on the driver torque request. For example, the desired acceleration module 218 may determine the desired acceleration using a relationship such as $$a_{desired}(g) = \frac{T_{rqst} * FDR}{9.81 * m(\text{kg}) * r(\text{m})} \quad (2)$$

where $a_{desired}(g)$ is the desired acceleration in g's, $T_{rqst}$ is the driver torque request, FDR is the final drive ratio from the output side the transmission 166 to the wheels 162, m(kg) is the mass of the vehicle in kilograms, and r(m) is the tire rolling radius in meters.

An acceleration delta module 220 determines an acceleration delta of the vehicle. The acceleration delta module 220 may set the acceleration delta equal to a difference between the actual acceleration and the desired acceleration. The acceleration delta module 220 may determine the value of the acceleration delta at a predetermined rate (e.g., every 12.5 milliseconds (ms), 25 ms, 50 ms, or 100 ms), and each value determined may be referred to as a sample of the acceleration delta.

The acceleration delta module 220 determines an average value of the acceleration delta over a first predetermined period (e.g., 50 ms to 150 ms) and/or the average value of a first predetermined number (e.g., 3, 5, or 7) of samples of acceleration delta. For example, in one iteration, the acceleration delta module 220 may determine the average value of first, second, and third samples. Then, in the next iteration, the acceleration delta module 220 may determine the average value of second, third, and fourth samples. In this regard, the average value may be referred to as a moving average.

A remedial action module 222 may take a remedial action based on the average value of the acceleration delta. For example, the remedial action module 222 may take the remedial action when the average value is greater than a predetermined acceleration (e.g., 0.2 g to 0.3 g) for a second predetermined period (e.g., 250 ms to 400 ms) and/or a second predetermined number (e.g., 10 to 64) of samples of acceleration delta. The remedial action may include decreasing the driver torque request to decrease the actual acceleration to a value that is less than the predetermined acceleration or temporarily shutting off of the engine 102 and/or the electric motor 198. The remedial action module 222 may take the remedial action independent of the motor torque command and/or the engine torque command.

In various implementations, if a moving average of the acceleration delta is greater than the predetermined acceleration, the acceleration delta module 220 starts determining an average value of multiple moving averages. Then, when the average value of the moving averages corresponds to the second predetermined period and/or the second predetermined number of samples, the remedial action module 222 compares the average value to the predetermined acceleration. If the average value of the moving averages is greater than the predetermined acceleration, the remedial action module 222 takes the remedial action.

The remedial action module 222 may stop taking the remedial action based on the average value of the acceleration delta after the remedial action is taken. For example, the remedial action module 222 may stop decreasing the driver torque request when the average value of the acceleration delta is less than the predetermined acceleration within a third predetermined period (e.g., 500 ms) and/or a third predetermined number (e.g., 20 to 80) of samples of acceleration delta. The third predetermined period may begin when the acceleration delta is greater than zero or when the remedial action module 222 initially decreases the driver torque request.

When the remedial action is taken, the remedial action module 222 may perform a diagnostic to identify the cause of the acceleration delta. If the cause is identified, the remedial action module 222 may adjust operation of the vehicle system 100 based on the cause identified to stop and/or prevent the acceleration delta. For example, the remedial action module 222 may determine that the cause of the acceleration delta is the current gear of the transmission 166, in which case the remedial action module 222 may shift gears of the transmission 166. In another example, the remedial action module 222 may determine that the cause of the acceleration delta is the electric motor 198, in which case the remedial action module 222 may use only the engine 102 to produce drive torque. In another example, the remedial action module 222 may determine that the cause of the acceleration delta is one of multiple electric motors, in which case the remedial action module 222 may use only the other electric motor(s) to produce drive torque.

If the average value of the acceleration delta is greater than or equal to the predetermined acceleration when the third predetermined period ends, the remedial action module 222 may shutoff the engine 102 and/or the electric motor 198. The remedial action module 222 may also set a diagnostic trouble code (DTC), and may not allow the engine 102 or the electric motor 198 to be restarted until the DTC is cleared. A service technician may diagnose and repair the cause of the acceleration delta, and may clear the DTC using, for example, a scan tool.

Figure 3:
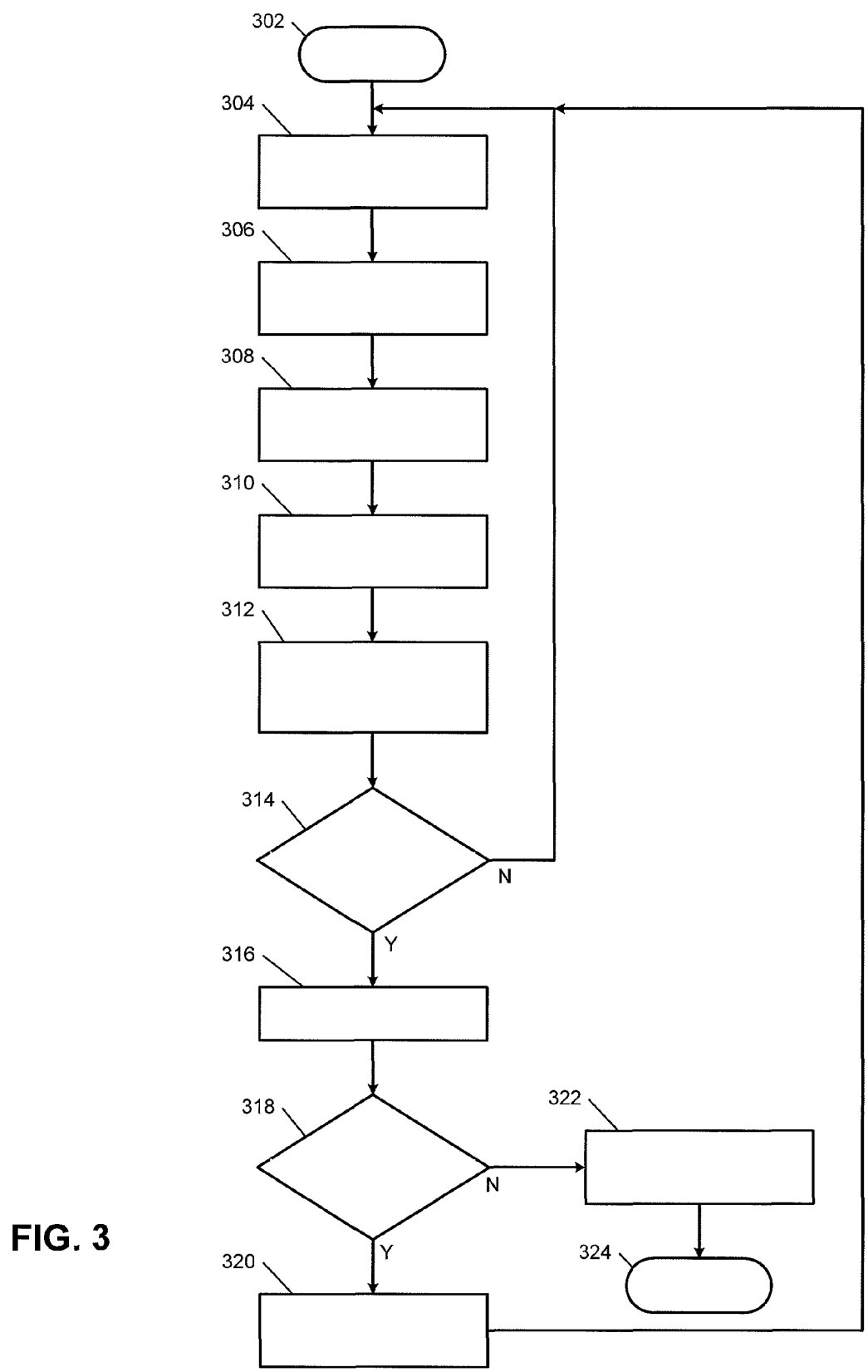
FIG. 3 is a flowchart illustrating an example control method according to the principles of the present disclosure.

Referring now to FIG. 3, a method for controlling vehicle acceleration begins at 302. At 304, the method determines the speed of a vehicle. The method may determine the vehicle speed based on a measured transmission output speed and/or a measured wheel speed.

At 306, the method determines the actual acceleration of the vehicle. The method may determine the actual acceleration based on the vehicle speed. For example, the method may determine the derivative of the vehicle speed with respect to time to obtain the actual acceleration. Alternatively, the method may determine the actual acceleration based on the transmission output speed directly using, for example, relationship (1) as described above.

At 308, the method determines a desired acceleration of the vehicle. The method may determine the desired acceleration based on a driver torque request using, for example, relationship (2) as described above. The method may determine the driver torque request based on a driver input such as the position of an acceleration pedal or a cruise control setting. The method may adjust the torque output of an engine and/or an electric motor based on the driver torque request.

At 310, the method determines an acceleration delta of the vehicle. The method may determine a difference between the actual acceleration and the desired acceleration to obtain the acceleration delta. The method may determine the acceleration delta at a predetermined rate (e.g., every 12.5 milliseconds (ms), 25 ms, 50 ms, or 100 ms), and each value determined may be referred to as a sample of the acceleration delta. The predetermined rate may be selected based on engine operating conditions.

At 312, the method determines an average value of the acceleration delta. The method may determine the average value of the acceleration delta over a first predetermined period (e.g., 50 ms to 150 ms) and/or the average value of a first predetermined number (e.g., 3, 5, or 7) of samples of acceleration delta. The method may determine the average value each time that the first predetermined period elapses and/or each time the first predetermined numbers of samples are obtained. In this regard, the average value corresponding to the first predetermined period and/or the first predetermined number of samples may be referred to as a moving average.

At 314, the method determines whether the average value of the acceleration delta is greater than a predetermined acceleration (e.g., 0.2 g to 0.3 g) for a second predetermined period (e.g., 250 ms to 400 ms) and/or a second predetermined number (e.g., 10 to 64) of samples of acceleration delta. If the average value of the acceleration delta is greater than the predetermined acceleration for the second predetermined period and/or the second predetermined number of samples, the method continues at 316. Otherwise, the method continues at 304.

In various implementations, prior to 314, if the moving average of the acceleration delta is greater than the predetermined acceleration, the method may start determining an average value of multiple moving averages. Then, when the average value of the moving averages corresponds to the second predetermined period and/or the second predetermined number of samples, the method may continue at 314. Then, at 314, the method may determine whether the average value of the moving averages is greater than the predetermined acceleration. If the average value of the moving averages is greater than the predetermined acceleration, the method may continue at 316. Otherwise, the method may continue at 304.

At 316, the method takes a remedial action. The method may take the remedial action independent of torque commands that are generated to control the engine and/or the electric motor. The remedial action may include decreasing the driver torque request to decrease the actual acceleration to a value that is less than the predetermined acceleration. Alternatively, the remedial action may include temporarily shutting off the engine and/or the electric motor.

At 318, the method determines whether the average value of the acceleration delta is less than the predetermined acceleration. The method may wait for a third predetermined period (e.g., 500 ms) to end and/or for a third predetermined number (e.g., 20 to 80) of acceleration delta samples to be obtained before continuing at 318. The third predetermined period may begin when the acceleration delta is greater than zero or when the method initially takes the remedial action.

If the average value of the acceleration delta is less than the predetermined acceleration, the method continues at 320 and stops taking the remedial action. Otherwise, the method continues at 322 and shuts off the engine and/or the electric motor. The method ends at 324.

Figure 4:
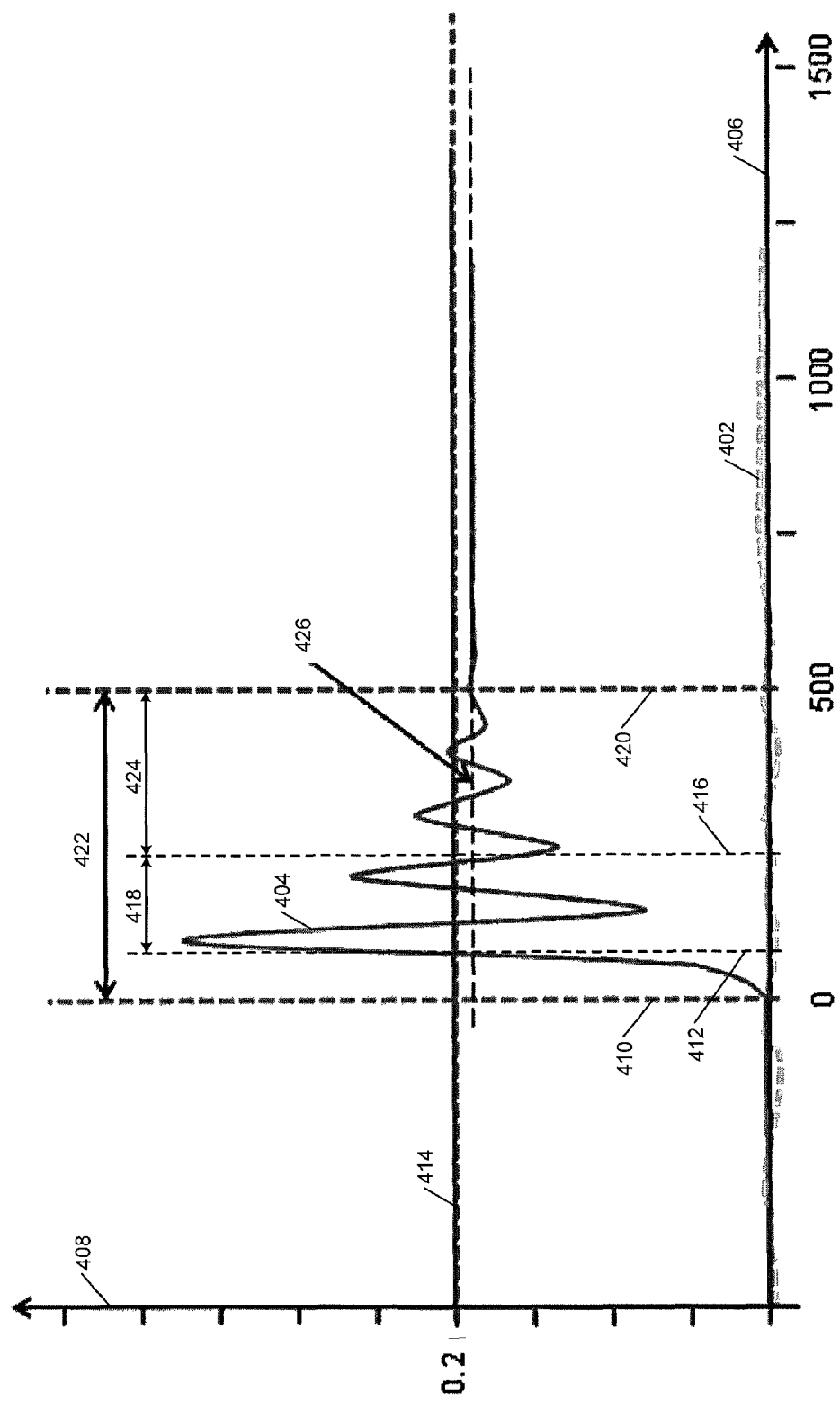
FIGS. 4 and 5 are graphs illustrating example desired vehicle accelerations and example vehicle acceleration deltas according to the principles of the present disclosure.

Referring now to FIG. 4, a desired acceleration 402 and an acceleration delta 404 are plotted with respect to an x-axis 406 that represents time in milliseconds (ms) and a y-axis 408 that represents acceleration in g's. A system and method according to the present disclosure determines an average value of the acceleration delta 404 corresponding to a first predetermined period (e.g., 50 ms to 150 ms) and/or a first predetermined number (e.g., 3, 5, or 7) of samples of the acceleration delta 404. The first predetermined period has a fixed duration with variable start and end times. In this regard, the average value of the acceleration delta 404 corresponding to the first predetermined period and/or the first predetermined number of samples may be referred to as a moving average. The system and method may select predetermined periods and/or predetermined numbers of samples based on the processing power of the system and the degree of accuracy desired when determining the average value of the acceleration delta 404.

At 410, the acceleration delta 404 starts to increase from zero. At 412, the moving average of the acceleration delta 404 is greater than a predetermined acceleration 414 (e.g., 0.2 g to 0.3 g). Thus, the system and method starts determining an average value of moving averages of the acceleration delta 404. At 416, the average value of the acceleration delta 404 is greater than the predetermined acceleration 414 for a second predetermined period 418 (e.g., 250 ms to 400 ms) and/or a second predetermined number (e.g., 10 to 64) of samples of the acceleration delta 404. In other words, at 416, the average value of the moving averages corresponds to the second predetermined period 418 and/or to the second predetermined number of samples, and is greater than the predetermined acceleration 414. Thus, the system and method takes a remedial action such as decreasing a torque request and/or temporarily shutting off an engine and/or an electric motor.

At 420, a third predetermined period (e.g., 500 ms) ends and/or a third predetermined number (e.g., 20 to 80) of samples of the acceleration delta 404 have been obtained. The third predetermined period may correspond to a period 422 from 410 to 420 or to a period 424 from 416 to 420. At the end of the third predetermined period, an average value 426 of the acceleration delta 404 is less than the predetermined acceleration 414. Thus, the system and method stops taking the remedial action.

Figure 5:
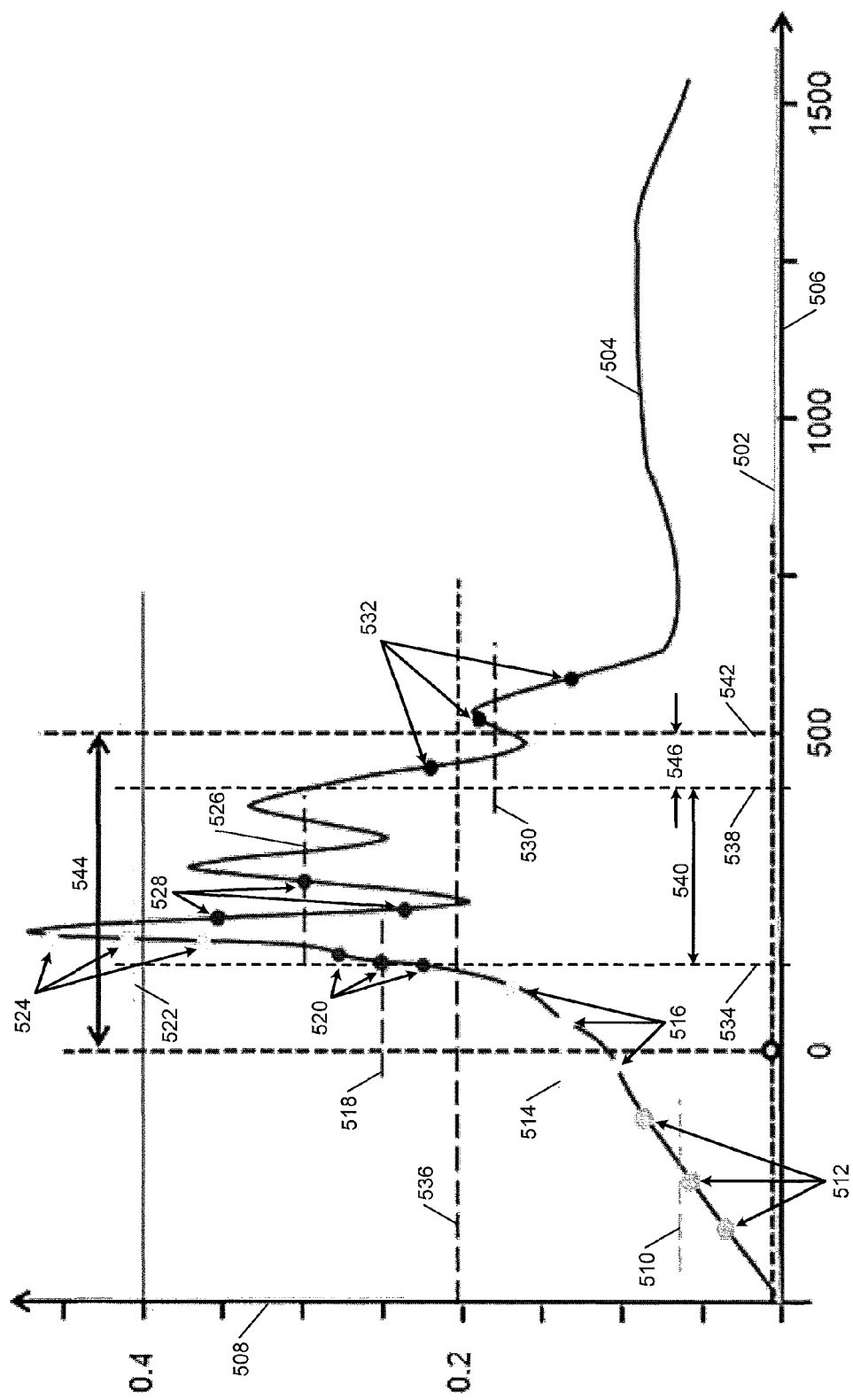

Referring now to FIG. 5, a desired acceleration 502 and an acceleration delta 504 are plotted with respect to an x-axis 506 that represents time in milliseconds (ms) and a y-axis 508 that represents acceleration in g's. A system and method according to the present disclosure determines average values of the acceleration delta 504 corresponding to a first predetermined period (e.g., 50 ms to 150 ms) and/or a first predetermined number (e.g., 3, 5, or 7) of samples of the acceleration delta 504. The first predetermined period has a fixed duration with variable start and end times. In this regard, the average value of the acceleration delta 504 corresponding to the first predetermined period and/or the first predetermined number of samples may be referred to as a moving average. The system and method may select predetermined periods and/or predetermined numbers of samples based on the processing power of the system and the degree of accuracy desired when determining the average value of the acceleration delta 504.

A first average value 510 of the acceleration delta 504 corresponds to samples 512 of the acceleration delta 504. A second average value 514 of the acceleration delta 504 corresponds to samples 516 of the acceleration delta 504. A third average value 518 of the acceleration delta 504 corresponds to samples 520 of the acceleration delta 504.

A fourth average value 522 of the acceleration delta 504 corresponds to samples 524 of the acceleration delta 504. A fifth average value 526 of the acceleration delta 504 corresponds to samples 528 of the acceleration delta 504. A sixth average value 530 of the acceleration delta 504 corresponds to samples 532 of the acceleration delta 504. The averages values 510, 514, 518, 522, 526, and 530 may each correspond to the first predetermined period and/or the first predetermined number of samples. Thus, the averages values 510, 514, 518, 522, 526, and 530 may be referred to as moving averages.

At 534, the moving average of the acceleration delta 504 (e.g., the third average value 518) is greater than a predetermined acceleration 536 (e.g., 0.2 g to 0.3 g). Thus, the system and method starts determining an average value of moving averages of the acceleration delta 504. At 538, the average value of the acceleration delta 504 is greater than the predetermined acceleration 536 for a second predetermined period 540 (e.g., 250 ms to 400 ms) and/or a second predetermined number (e.g., 10 to 64) of samples of the acceleration delta 504. In other words, at 538, the average value of the moving averages corresponds to the second predetermined period 540 and/or to the second predetermined number of samples, and is greater than the predetermined acceleration 536. Thus, the system and method takes a remedial action such as decreasing a torque request and/or temporarily shutting off an engine and/or an electric motor.

At 542, a third predetermined period (e.g., 500 ms) ends and/or a third predetermined number (e.g., 20 to 80) of samples of the acceleration delta 504 have been taken. The third predetermined period may correspond to a period 544 from 0 ms to 542 or to a period 546 from 538 to 542. At the end of the third predetermined period, the moving average of the acceleration delta 504 (e.g., the sixth average value 530) is less than the predetermined acceleration 536. Thus, the system and method stops taking the remedial action.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
   an acceleration delta module that:
      determines an acceleration delta of a vehicle based on a difference between an actual acceleration of the vehicle and a desired acceleration of the vehicle; and
      determines an average value of the acceleration delta corresponding to at least one of a first predetermined period and a predetermined number of samples of the acceleration delta; and
   a remedial action module that, based on the average value of the acceleration delta and independent of a torque command generated to accelerate the vehicle, selectively takes a remedial action by adjusting operation of at least one of an engine and an electric motor.

2. The system of claim 1 wherein the remedial action module takes the remedial action without shutting off the at least one of the engine and the electric motor.

3. The system of claim 1 further comprising a powertrain control module that controls a torque output of the at least one of the engine and the electric motor based on a driver torque request, wherein the remedial action module selectively decreases the driver torque request when the average value of the acceleration delta is greater than a predetermined acceleration.

4. The system of claim 3 wherein the remedial action module decreases the driver torque request when the average value of the acceleration delta is greater than the predetermined acceleration for a second predetermined period.

5. The system of claim 4 wherein the remedial action module stops decreasing the driver torque request when the average value of the acceleration delta is less than the predetermined acceleration within a third predetermined period.

6. The system of claim 5 wherein the third predetermined period begins when the acceleration delta is greater than zero.

7. The system of claim 5 wherein the third predetermined period begins when the driver torque request is initially decreased.

8. The system of claim 5 wherein the remedial action shuts off the at least one of the engine and the electric motor if the average value of the acceleration delta is greater than or equal to the predetermined acceleration when the third predetermined period ends.

9. The system of claim 3 further comprising an actual acceleration module that determines the actual acceleration based on a measured transmission output speed.

10. The system of claim 3 further comprising a desired acceleration module that determines the desired acceleration based on the driver torque request.

11. A method comprising:
- determining an acceleration delta of a vehicle based on a difference between an actual acceleration of the vehicle and a desired acceleration of the vehicle;
- determining an average value of the acceleration delta corresponding to at least one of a first predetermined period and a predetermined number of samples of the acceleration delta; and
- based on the average value of the acceleration delta and independent of a torque command generated to accelerate the vehicle, selectively taking a remedial action by adjusting operation of at least one of an engine and an electric motor.

12. The method of claim 11 further comprising taking the remedial action without shutting off the at least one of the engine and the electric motor.

13. The method of claim 11 further comprising:
- controlling a torque output of the at least one of the engine and the electric motor based on a driver torque request; and
- selectively decreasing the driver torque request when the average value of the acceleration delta is greater than a predetermined acceleration.

14. The method of claim 13 further comprising decreasing the driver torque request when the average value of the acceleration delta is greater than the predetermined acceleration for a second predetermined period.

15. The method of claim 14 further comprising stop decreasing the driver torque request when the average value of the acceleration delta is less than the predetermined acceleration within a third predetermined period.

16. The method of claim 15 wherein the third predetermined period begins when the acceleration delta is greater than zero.

17. The method of claim 15 wherein the third predetermined period begins when the driver torque request is initially decreased.

18. The method of claim 15 wherein the remedial action shuts off the at least one of the engine and the electric motor if the average value of the acceleration delta is greater than or equal to the predetermined acceleration when the third predetermined period ends.

19. The method of claim 13 further comprising determining the actual acceleration based on a measured transmission output speed.

20. The method of claim 13 further comprising determining the desired acceleration based on the driver torque request.

* * * * *